(12) United States Patent
Umehara (10) Patent No.: US 12,184,359 B2
(45) Date of Patent: Dec. 31, 2024

(54) COMMUNICATION DEVICE AND METHOD FOR CONTROLLING SAME AND NON-TRANSITORY COMPUTER-READABLE STORAGE MEDIUM

(71) Applicant: CANON KABUSHIKI KAISHA, Tokyo (JP)

(72) Inventor: Makoto Umehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 17/508,777

(22) Filed: Oct. 22, 2021

(65) Prior Publication Data

US 2022/0045724 A1    Feb. 10, 2022

Related U.S. Application Data (63) Continuation of application No. PCT/JP2020/007316, filed on Feb. 25, 2020.

(30) Foreign Application Priority Data

Apr. 26, 2019   (JP) .................. 2019-085799

(51) Int. Cl.
   *H04L 5/00*    (2006.01)
   *H04B 7/0413*  (2017.01)
   (Continued)

(52) U.S. Cl.
   CPC ......... *H04B 7/0413* (2013.01); *H04L 5/0048* (2013.01); *H04W 16/28* (2013.01); *H04W 28/16* (2013.01)

(58) Field of Classification Search
   CPC ..... H04W 16/28; H04W 28/16; H04W 84/12; H04B 7/0413; H04L 5/0048; H04L 27/26132
   See application file for complete search history.

(56) References Cited

U.S. PATENT DOCUMENTS 9,826,532  B1   11/2017   Chu
2015/0023272 A1  1/2015  Choi et al.
(Continued)

FOREIGN PATENT DOCUMENTS

CN    102714631 A    10/2012
CN    105120520 A    12/2015
(Continued)

OTHER PUBLICATIONS

Bo (Boyce) Yang, et al.; Considerations on AP Coordination, IEEE Draft; IEEE-SA Mentor, XP068128896, vol. 802.11 EHT, No. 1, Sep. 14, 2018, p. 1-15; (URL: https://mentor,ieee.org/802.11/dcn/18/11-18-1576-01-0eht-considerations-on-ap-coordination.pptx) (Retrieved on Sep. 14, 2018).
(Continued)

*Primary Examiner* — Rahel Guarino
(74) *Attorney, Agent, or Firm* — Canon U.S.A., Inc. IP Division (57) ABSTRACT

The invention provides a mechanism for reducing residual frequency differences in distributed MIMO using a slave trigger, and increasing synchronization precision between APs. The communication device, which constitutes a wireless network by cooperating with another communication device, has a transmission unit for transmitting a frame for synchronization to the other communication device to cooperate with the other communication device. The transmission unit includes: a setting unit that sets a value exceeding 4 as a repetition number for an EHT Long Training Field (EHT-LTF) in a preset position of an EHT Signal Field (EHT-SIG-A) of a frame for synchronization; and a generation unit that generates a frame for synchronization, the frame including EHT-LTFs whose quantity is the set repetition number. The transmission unit transmits the generated frame to the other communication device.

3 Claims, 9 Drawing Sheets

(51) Int. Cl.
*H04W 16/28* (2009.01)
*H04W 28/16* (2009.01)

(56) References Cited

U.S. PATENT DOCUMENTS

2015/0023335 A1   1/2015  Vermani et al.
2020/0077351 A1*  3/2020  Porat ................. H04W 56/0015
2022/0070755 A1*  3/2022  Park .................... H04L 27/2601

FOREIGN PATENT DOCUMENTS

| JP | 2016-530776 A | 9/2016 |
| JP | 2018-050133 A | 3/2018 |
| WO | 2015/009846 A | 1/2015 |
| WO | 2019/045708 A1 | 3/2019 |

OTHER PUBLICATIONS

Park Eunsung, et al.; Overview of PHY Features for EHT; IEEE 802. 11-18/1967 R1, IEEE-SA Mentor, XP068159645; Jan. 14, 2019, p. 1-22; (URL: https://mentor.ieee.org/802.11/dcn/18/11-18-1967-01-0eht-overview-of-phy-features-for-eht.pptx) (Retrieved on Dec. 4, 2022).
Ron Porat (Broadcom), Initial Distributed MU MIMO Simulations, IEEE 802. 11-18/1962r0, IEEE, Nov. 12, 2018, Apr. 6, 2020.
Eunsung Park (LG Electronics), Overview of PHY Features for EHT, IEEE 802. 11-18/1967r0, IEEE, Nov. 12, 2018, Apr. 6, 2020.

* cited by examiner

| | Bit POSITION | SUB FIELD | NUMBER OF BITS | DESCRIPTION |
|---|---|---|---|---|
| EHT-SIG-A1 | B0 | Format | 1 | IN ORDER TO DIFFERENTIATE FROM EHT TB PPDU, WHEN "EHT PPDU AND EHT ER PPDU", 1 |
| | B1 | Beam Change | 1 | WHEN pre-EHT OF PPDU IS ARRANGED IN SPACE DIFFERENT FROM FIRST SYMBOL OF EHT-LTF, 1, AND WHEN SIMILARLY MAPPED, 0 |
| | B2 | UL/DL | 1 | INDICATES WHETHER PPDU IS FOR UL OR FOR DL, AND IS SAME VALUE AS TXVECTOR UPLINK_FLAG |
| | B3-B7 | MCS | 5 | VALUE OF Modulation and Coding Scheme IN CASE OF EHT SU PPDU: n=0, 1, 2, ... 17 |
| | B8 | DCM | 1 | INDICATES WHETHER Dual Carrier Modulation IS APPLIED TO DATA FIELD. IN CASE WHERE STBC FIELD IS 0: 1 (WHEN BOTH FIELDS OF DCM AND STBC ARE 1, NEITHER IS APPLIED) IN CASE WHERE DCM IS NOT APPLIED: 0 |
| | B9-B14 | BSS Color | 6 | 6 BITS FOR IDENTIFYING BSS |
| | B15-B18 | Spatial Reuse | 4 | INDICATES WHETHER OR NOT Spatial Reuse IS PERMITTED DURING TRANSMISSION OF THIS PPDU. SETS VALUE OF Spatial Reuse field encoding. |
| | B19-B20 | Bandwidth | 2 | IN CASE OF EHT SU PPDU: WHEN 20 MHz, 0; WHEN 40 MHz, 1; WHEN 80 MHz, 2; WHEN 160 MHz (80+80 MHz), 3; IN CASE OF EHT ER SU PPDU: WHEN 242-tone RU, 0; WHEN upper 106-tone RU of primary 20 MHz, 1. |
| | B21-B23 | GI + LTF Size | 3 | INDICATES Guard Interval PERIOD AND SIZE OF EHT-LTF.<br>WHEN 1×EHT-LTF AND 0.8 μs GI, 0<br>WHEN 2×EHT-LTF AND 0.8 μs GI, 1<br>WHEN 2×EHT-LTF AND 1.6 μs GI, 2<br>WHEN 4×EHT-LTF AND 0.8 μs GI, 3<br>WHEN 4×EHT-LTF AND 1.6 μs GI, 4<br>WHEN 6×EHT-LTF AND 0.8 μs GI, 5<br>WHEN 6×EHT-LTF AND 1.6 μs GI, 6<br>WHEN 8×EHT-LTF AND 0.8 μs GI, 7 |
| | B24-B26 | NSTS And Midamble Periodicity | 3 | NUMBER OF space-time streams AND MIDAMBLE PERIODICITY FOR FRAME SYNCHRONIZATION. IN CASE WHERE Doppler FIELD IS 0: NUMBER OF space-time streams − 1. IN CASE WHERE Doppler FIELD IS 1: B23 - 24 IS NUMBER OF space-time streams. B25 IS 0 WHEN MIDAMBLE PERIODICITY IS 10, AND 1 WHEN 20. |

F I G. 11

| | Bit POSITION | SUB FIELD | NUMBER OF BITS | DESCRIPTION |
|---|---|---|---|---|
| EHT-SIG-A2 | B0-B6 | TXOP | 7 | Transmission Opportunity. IN CASE WHERE TXOP_DURATION OF TXVECTOR IS UNSPECIFIED AND THERE IS NO PERIOD INFORMATION, 127. WHEN TXOP_DURATION OF TXVECTOR IS SMALLER THAN 512, VALUE SMALLER THAN 127 IS SET IN ORDER TO SET NAV. AT THAT TIME, WHEN B0 IS 0, B1-B6 IS FLOOR (ROUND DOWN) OF TXOP_DURATION/8. WHEN B0 IS 1, B1-B6 IS FLOOR OF (TXOP_DURATION-512)/8. |
| | B7 | Coding | 1 | WHEN BCC (Binary Convolutional Code), 0; WHEN LDPC (Low Density Parity Check), 1 |
| | B8 | LDPC Extra Symbol Segment | 1 | INDICATES WHETHER THERE IS extra OFDM SYMBOL SEGMENT FOR LDPC |
| | B9 | STBC | 1 | USES STBC (Space-Time Block Coding), AND WHEN DCM IS ZERO, THIS FIELD IS 1. WHEN DCM AND STBC ARE NOT APPLIED, ALSO 1. OTHERWISE, 0. |
| | B10 | Beamformed | 1 | WHEN APPLYING BEAMFORMING/STEERING TO WAVEFORM OF SU TRANSMISSION, 1 |
| | B11-B12 | Pre-FEC Padding Factor | 2 | WHEN Pre-FEC Padding Factor is 4, 0; WHEN 1, 1; WHEN 2, 2; WHEN 3, 3 |
| | B13 | PE Disambiguity | 1 | Disambiguity Field of Packet Extension |
| | B14 | Reserved | 1 | RESERVED FIELD. |
| | B15 | Doppler | 1 | WHEN EITHER OF FOLLOWING CONDITIONS IS MET, 1 · NUMBER OF OFDM SYMBOLS OF DATA FIELD IS LARGER THAN "VALUE INDICATED IN MIDAMBLE PERIODICITY+1" AND THERE IS MIDAMBLE · NUMBER OF OFDM SYMBOLS OF DATA FIELD IS LESS THAN OR EQUAL TO "VALUE INDICATED IN MIDAMBLE PERIODICITY+1", THERE IS NO MIDAMBLE, AND CHANGE OF CHANNEL IS FAST |
| | B16-B19 | CRC | 4 | EHT-SIG-A UP TO THIS POINT CRC OF FIELD (26 BITS OF A1 AND 16 BITS FROM A2 TO B15, TOTAL OF 41 BITS) |
| | B20-B25 | Tail | 6 | FIELD IN WHICH 0 IS SET SO AS TO INDICATE END TO TRELLIS CONVOLUTIONAL DECODER |

FIG. 12

COMMUNICATION DEVICE AND METHOD FOR CONTROLLING SAME AND NON-TRANSITORY COMPUTER-READABLE STORAGE MEDIUM

CROSS-REFERENCE TO RELATED APPLICATIONS

This application is a Continuation of International Patent Application No. PCT/JP2020/007316, filed Feb. 25, 2020, which claims the benefit of Japanese Patent Application No. 2019-085799, filed Apr. 26, 2019, both of which are hereby incorporated by reference herein in their entireties.

BACKGROUND OF THE INVENTION

Field of the Invention

The present invention relates to a communication device and a method for controlling the same, and a computer program.

Background Art

In recent years, Internet usage has been increasing year by year together with the development of information communication technologies, and various communication techniques are being developed in response to the increase in demand. In particular, wireless local area network (wireless LAN) techniques realize throughput improvement in Internet communications for packet data, audio, video, and the like by wireless LAN terminals, and various technological development is still being conducted actively.

In the development of wireless LAN techniques, a lot of standardization work by the IEEE (Institute of Electrical and Electronics Engineers) 802, which is a standardization institution for wireless LAN techniques, plays an important role. The standards of wireless LAN communication are known as the IEEE 802.11 standards, and there are standards such as IEEE 802.11n/a/b/g/ac and IEEE 802.11ax. For example, IEEE 802.11ax implements a high peak throughput of up to 9.6 gigabits per second (Gbps) and additionally improves the communication speed under a congestion situation using OFDMA (Orthogonal Frequency-Division Multiple Access) (PTL 1).

Recently, in order to further improve throughput, a study group called IEEE 802.11 EHT (Extremely High Throughput) has been formed as a subsequent standard of IEEE 802.11ax. Distributed MIMO is being considered as one measure for improving throughput which EHT aims to achieve. A characteristic of Distributed MIMO is in that a plurality of APs perform collaborative operation, and improvement in communication speed can be expected with an increase in the number of usable antennas. A method of synchronizing a plurality of APs using frames called slave triggers is being proposed as a method of implementing Distributed MIMO. In this method, a slave-AP detects frequency differences with respect to a slave trigger transmitted from a master-AP, and performs frequency correction so as to synchronize with the master-AP.

In the above-described Distributed MIMO, synchronization between APs becomes necessary for a plurality of APs to perform collaborative operation. In a method in which slave triggers are used, a slave-AP detects frequency differences with respect to a slave trigger transmitted from a master-AP, and performs frequency correction so as to synchronize with the master-AP. This frequency correction processing is performed using a preamble signal included in a slave trigger. However, there was a problem that synchronization precision between APs would decrease by occurrence of residual frequency differences due to thermal noise and the like, thereby decreasing communication performance.

CITATION LIST

Patent Literature

PTL 1 Japanese Patent Laid-Open No. 2018-50133

SUMMARY OF INVENTION

The present invention has been made in consideration of the above problem, and provides a technique capable of increasing synchronization precision between APs in Distributed MIMO than ever before.

Solution to Problem

In order to solve this problem, a communication device of the present invention comprises the following configuration, for example. In other words, a communication device that constitutes a wireless network by cooperating with another communication device, wherein the communication device has a transmission unit that transmits a frame for synchronization to the other communication device in order to cooperate with the other communication device, and the transmission unit includes: a setting unit that sets a value exceeding 4 as a repetition number for an EHT Long Training Field (EHT-LTF) in a preset position of an EHT Signal Field (EHT-SIG-A) of a frame for synchronization; and a generation unit that generates a frame for synchronization, the frame including EHT-LTFs whose quantity is the set repetition number, wherein the transmission unit transmits the generated frame for synchronization to the other communication device.

Advantageous Effects of Invention

According to various embodiments of the present invention, synchronization precision between APs in Distributed MIMO can be increased to be higher than ever before.

Further features of the present invention will become apparent from the following description of exemplary embodiments with reference to the attached drawings.

BRIEF DESCRIPTION OF DRAWINGS

FIG. 10 is a table indicating a bit position and meaning of a subfield of EHT-SIG-A 1 within a frame.

FIG. 11 is a table indicating a bit position and meaning of a subfield of EHT-SIG-A 2 within a frame.

DESCRIPTION OF THE EMBODIMENTS

Hereinafter, embodiments will be described in detail with reference to the attached drawings. Note that the following embodiments are merely specific examples of the embodiments of the present invention, and do not limit the present invention. Although a plurality of features are described in the embodiments, not all of the plurality of features are essential to the present invention, and the plurality of features may be arbitrarily combined. Furthermore, in the accompanying drawings, the same reference numerals are assigned to the same or similar components, and a repetitive description thereof is omitted.

First Embodiment

[System Configuration]

Figure 1:
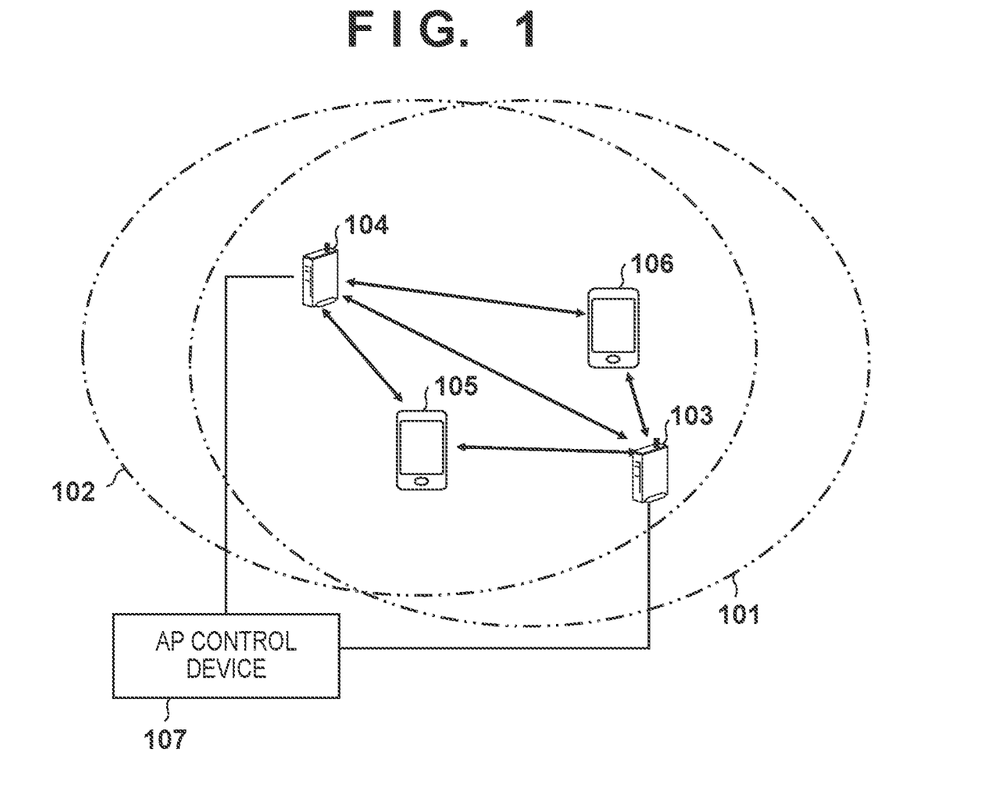
FIG. 1 is a view illustrating an example of a network configuration.

FIG. 1 illustrates an example of a network configuration according to a first embodiment. A wireless communication system of FIG. 1 is a wireless network equipped with a plurality of APs (base stations; Access Points) 103 and 104 and a plurality of STAs (Stations) 105 and 106.

The APs 103 and 104 and the STAs 105 and 106 perform communication in accordance with a wireless communication method of the IEEE 802.11 EHT standard. A range that signals that the AP 103 transmits reach is indicated in a circle 101, and a range that signals that the AP 104 transmits reach is indicated in a circle 102. Also, as illustrated, the APs 103 and 104 can both communicate with the STAs 105 and 106. Also, the AP 103 and the AP 104 can similarly communicate. The AP 103 and the AP 104 can execute Distributed MIMO (hereinafter referred to as D-MIMO) communication. In other words, the AP 103 and the AP 104 can communicate with the STAs 105 and 106 by performing collaborative operation. The APs 103 and 104 are connected by a backhaul line so as to be able to communicate with each other for collaborative operation, and are controlled by an AP control device 107. Regarding the AP control device 107, any one AP of a plurality of APs may have its function. Note that although in the present embodiment, it is assumed that the AP 103 will operate as the master-AP and the AP 104 will operate as the slave-AP, the method for setting which AP will operate as the master-AP does not particularly matter, and the AP control device 107 may set it in advance or the setting may be performed by an operation of a switch (not shown) arranged on each AP.

It should be noted that the configuration of the wireless communication network shown in FIG. 1 is merely an example for illustrative purposes, and, for example, a network including a large number of EHT devices and legacy devices (communication devices that comply with an IEEE 802.11a/b/g/n/ax standard) in a wider area may be configured. Also, the arrangement of the communication devices is not limited to that shown in FIG. 1, and the following argument is applicable to various positional relationships of the communication devices as well. Also, EHT may be understood as an abbreviation of Extreme High Throughput.

[AP Configuration]

Figure 2:
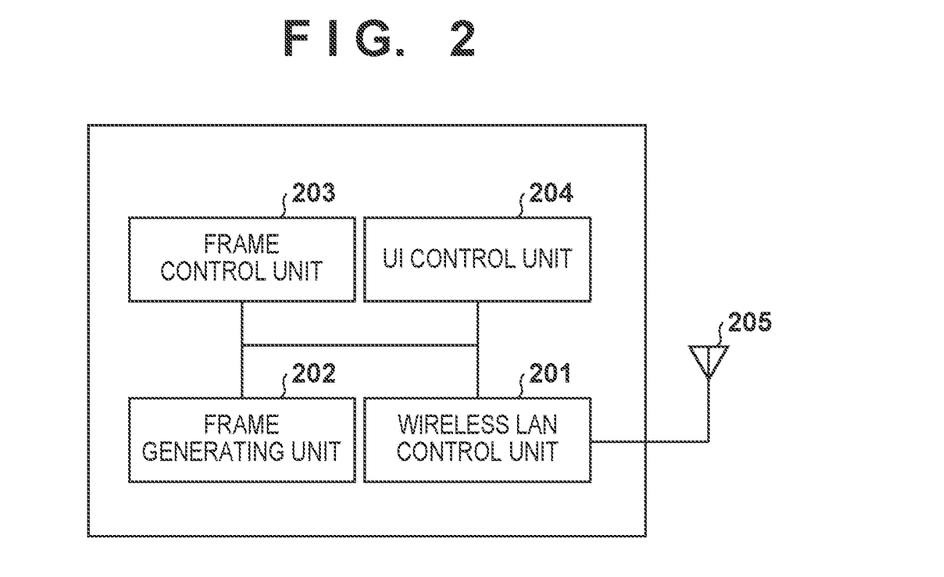
FIG. 2 is a view illustrating an example of a functional configuration of an AP.

FIG. 2 is a functional block diagram of the APs 103 and 104. The APs 103 and 104 has, as an example of the functional configuration thereof, a wireless LAN control unit 201, a frame generating unit 202, a frame control unit 203, and a UI (user interface) control unit 204.

The wireless LAN control unit 201 may be configured to include one or more antennas 205 for performing transmission/reception of wireless signals (radio frames) to and from another wireless LAN devices and a circuit, and a program for controlling these. The wireless LAN control unit 201 executes communication control of a wireless LAN based on frames generated by the frame generating unit 202 in accordance with the standard of the IEEE802.11 series.

The frame generating unit 202 generates frames to be transmitted by the wireless LAN control unit 201 based on instructions of the frame control unit 203. Although details will be made clear from descriptions to be given later, the frame control unit 203 of the AP 103, which is the master, in a case where a frame to be transmitted is a slave trigger for D-MIMO, performs the following settings for the frame generating unit 202.

Set a value exceeding 4 as a repetition number for an EHT Long Training Field (EHT-LTF) in a preset position (refer to FIGS. 9 and 10) of an EHT Signal Field (EHT-SIG-A) of a frame.

Perform an instruction for generating EHT-LTFs whose quantity is the set repetition number.

The frame generating unit 202 generates a slave trigger for D-MIMO in accordance with this instruction.

Note that the frame generating unit 202 may create frames independently of instructions of the frame control unit 203.

Figure 3:
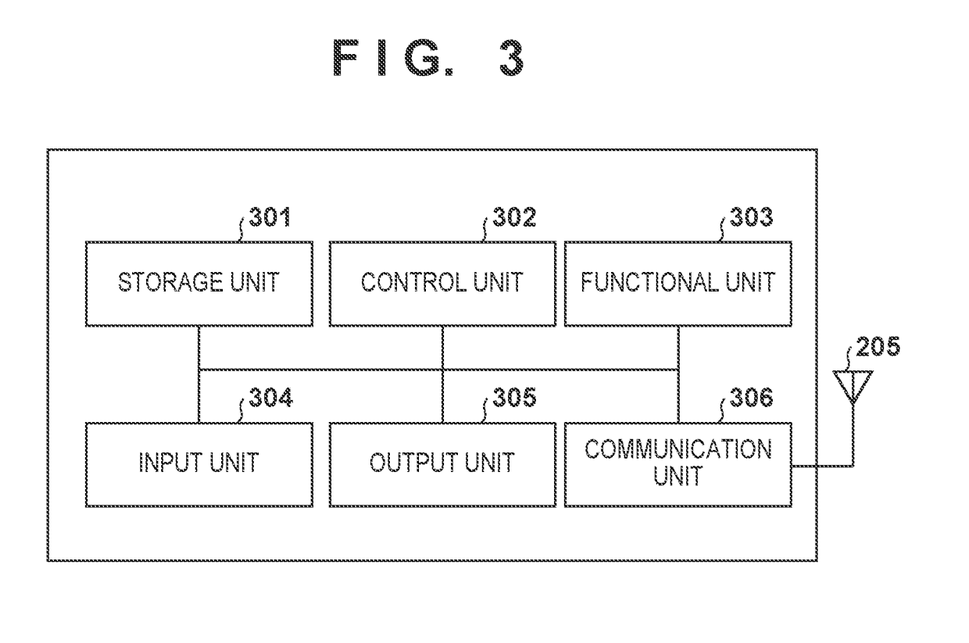
FIG. 3 is a view illustrating an example of a hardware configuration of the AP.

The UI control unit 204 accepts operations with respect to an input unit 304 (FIG. 3) by a user (not shown) of the APs 103 and 104, and performs control for delivering, to each configuration element, control signals corresponding to these operations or output (including display and the like) control with respect to an output unit 305 (FIG. 3).

FIG. 3 illustrates hardware configurations of the APs 103 and 104 in the present embodiment. The APs 103 and 104 has, as an example of the hardware configuration thereof, a storage unit 301, a control unit 302, a functional unit 303, the input unit 304, the output unit 305, and a communication unit 306, and one or more antennas 205.

The storage unit 301 is configured by both or either one of a ROM and a RAM, and stores various kinds of information such as programs for performing various operations to be described later and communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is configured by, for example, a processor such as a CPU or an MPU, an ASIC (application-specific integrated circuit), a DSP (digital signal processor), an FPGA (field-programmable gate array), or the like. Here, CPU is an acronym for a Central Processing Unit, and MPU is an acronym for a Micro Processing Unit. The control unit 302 controls the entire the APs 103 and 104 by executing the programs stored in the storage unit 301. Note that the control unit 302 may control the entire the APs 103 and 104 by cooperation of the programs stored in the storage unit 301 and the OS (Operating System).

Also, the control unit 302 executes predetermined processing such as image capturing, printing, and projection by controlling the functional unit 303. The functional unit 303 is hardware for the APs 103 and 104 for executing predetermined processing. For example, in a case where the APs 103 and 104 are image capturing devices as typified by digital cameras, the functional unit 303 is an image capturing unit and performs image capturing processing. Also, for example, in a case where the APs 103 and 104 are image forming devices as typified by printers, the functional unit 303 is a printing unit and performs printing processing. Also, for example, in a case where the APs 103 and 104 are projection devices as typified by projectors, the functional unit 303 is a projection unit and performs projection processing. Data to be processed by the functional unit 303 may be data stored in the storage unit 301, or may be data communicated from an STA or another AP via the communication unit 306 to be described later.

The input unit 304 performs acceptance of various operations from the user. The output unit 305 performs various outputs to the user. Here, outputs by the output unit 305 include at least one of displaying on a screen, audio output by a loudspeaker, vibration output, and the like. Note that both the input unit 304 and the output unit 305 may be implemented by one module, like a touch panel.

The communication unit 306 performs control (includes modulation and encoding processing) of wireless communication complying with the IEEE 802.11 EHT standard, control of wireless communication complying with Wi-Fi, and control of IP (Internet Protocol) communication. Also, the communication unit 306 performs transmission/reception of radio signals for wireless communication by controlling the one or more antennas 205. In that case, MIMO (Multi Input Multi Output) communication that uses spatial streams becomes possible. The APs 103 and 104 communicate content such as image data, document data, and video data with another communication device via the communication unit 306. Note that the functions of each configuration element illustrated in FIG. 3 may be implemented partially by software.

[STA Configuration]

The functional configurations and the hardware configurations of the STAs 105 and 106 are respectively the same configuration as the above functional configurations (FIG. 2) and the hardware configurations (FIG. 3) of the APs 103 and 104. In other words, each of the STAs 105 and 106 may be configured to include, as a functional configuration, the wireless LAN control unit 201, the frame generating unit 202, the frame control unit 203, and the UI control unit 204, and include, as a hardware configuration, the storage unit 301, the control unit 302, the functional unit 303, the input unit 304, the output unit 305, the communication unit 306, and the one or more antennas 205.

[Processing Flow]

Figure 4:
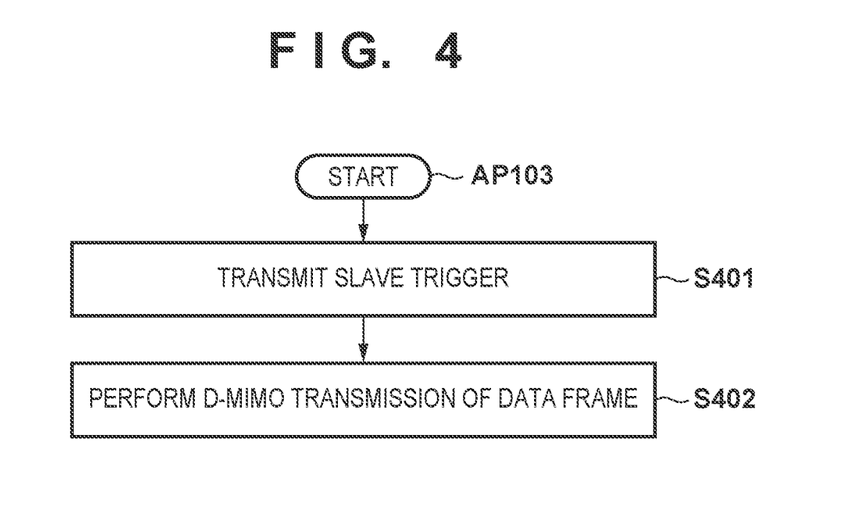
FIG. 4 is a flowchart illustrating processing to be executed by a master-AP.
Figure 5:
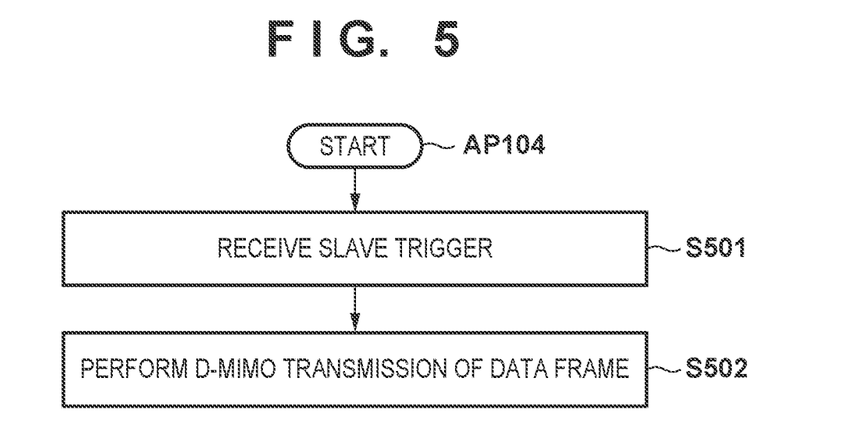
FIG. 5 is a flowchart illustrating processing to be executed by a slave-AP.

Next, a flow of processing to be executed by the AP 103 configured as described above and a sequence of processing to be executed by the wireless communication system illustrated in FIG. 1 will be described with reference to FIG. 4 to FIG. 6. Here, description will be given for an example of operation in which the APs 103 and 104 perform data transmission by D-MIMO to the STA 105 by collaborative operation. Each of FIG. 4 and FIG. 5 illustrate a flowchart indicating processing to be executed by the APs 103 and 104. The flowcharts illustrated in FIG. 4 and FIG. 5 may be realized by the control unit 302 of each of the APs 103 and 104 executing calculation and processing of information and control of each piece of hardware by executing control programs stored in the storage unit 301. Also, FIG. 6 illustrates a sequence chart of processing to be executed in the wireless communication system.

Figure 6:
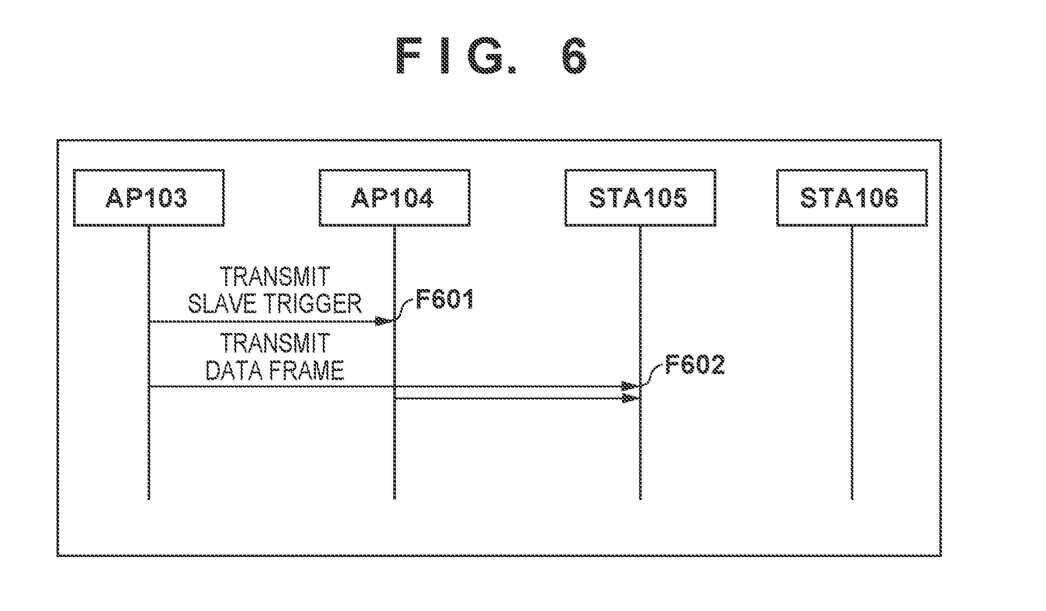
FIG. 6 is a sequence chart illustrating processing to be executed in a wireless communication network.

In the sequence chart of FIG. 6, the APs 103 and 104 perform D-MIMO transmission of a data frame. In performing D-MIMO transmission of this data frame, the AP 104, which is the slave-AP, has to synchronize with the AP 103, which is the master-AP. For this synchronization processing, the AP 103 transmits a slave trigger to the AP 104 prior to data frame transmission. Although in the present embodiment, it is assumed that slave triggers are transmitted based on trigger frames of the IEEE 802.11ax standard, the present invention is not limited to this. Note that it is assumed that CSI (Channel State Information) for the APs 103 and 104 to perform D-MIMO transmission to the STA 105 are acquired in advance.

The AP 103, which is the master, transmits a slave trigger to the AP 104 (step S 401; F601). The AP 104, which is the slave, detects a frequency difference from the received slave trigger and corrects the frequency to synchronize with the AP 103 (step S501).

(Concrete Example of Synchronization Processing)

Figure 7:
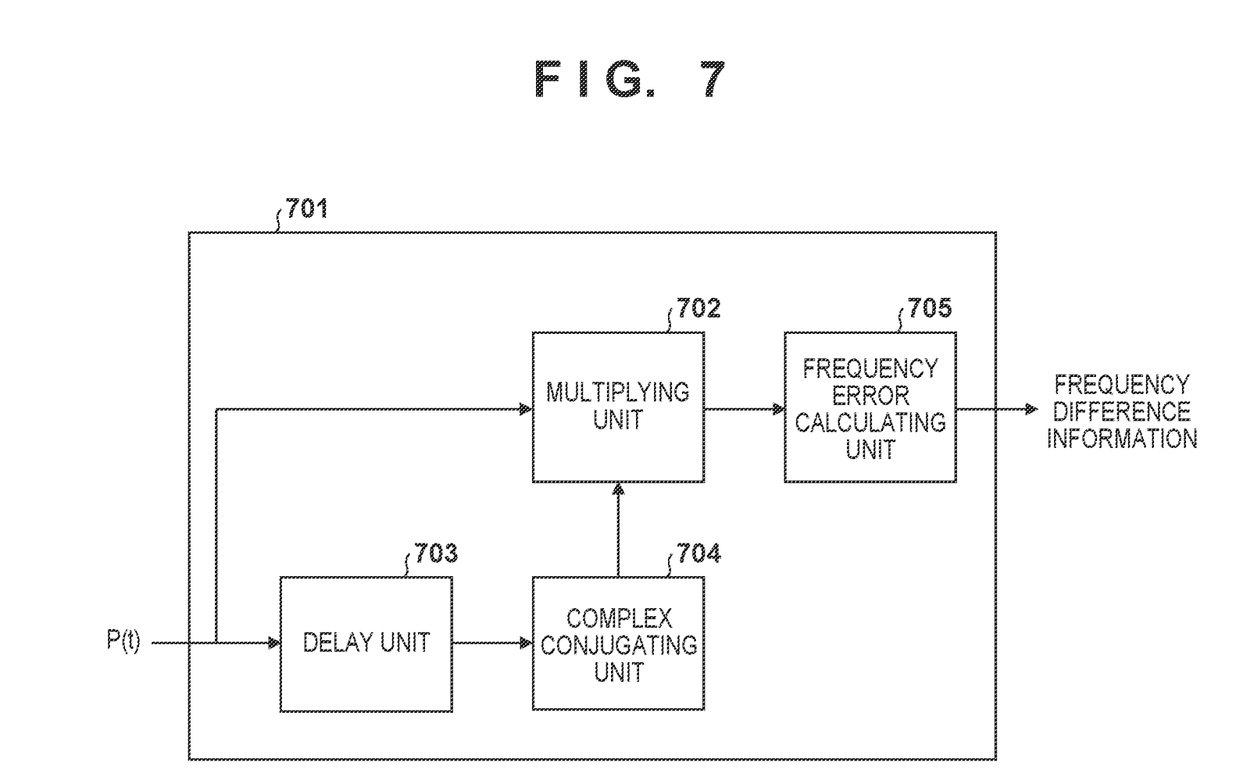
FIG. 7 is a view illustrating an example of a configuration of a frequency difference detection unit.

Here, frequency correction processing will be described with reference to FIG. 7. FIG. 7 is a block diagram illustrating an example of a configuration of a frequency difference detection unit 701. The frequency difference detection unit 701 is included in the wireless LAN control unit 201.

The frequency difference detection unit 701 detects frequency differences using a repetition signal section included in a received signal. In the IEEE 802.11 standard, STF (Short Training Field) and LTF (Long Training Field) are specified as repetition signals.

The communication unit 306 of the AP 104 generates an in-phase wave detection axis signal (hereinafter, I signal) and a quadrature wave detection axis signal (hereinafter, Q signal) by performing orthogonal demodulation of a wireless signal received via the antenna 205 and generates a signal P(t) to be supplied to the frequency difference detection unit 701.

The frequency difference detection unit 701 supplies the inputted signal P(t) to a multiplying unit 702 and a delay unit 703. Here, if a frequency difference between the AP 103 and the AP 104 is set as $\Delta f$, P(t) can be expressed in the following Expression (1).

$$P(t)=I(t)+j \times Q(t) \propto \exp(j \times 2 \times \pi \times (f-\Delta f) \times t) \quad (1)$$

The delay unit 703 generates a delay signal P(t-T) which is the inputted signal P(t) delayed by a repetition signal period T and outputs it to a complex conjugating unit 704.

STF and LTF are designed such that T=n/f. Accordingly, the delay signal P(t-T) can be expressed in the following Equation (2) and will be a signal in which the phase of the input signal P(t) is advanced by $\Delta\theta=2\times\pi\times\Delta f\times T$.

$$P(t-T) \propto \exp(j \times 2 \times \pi \times (f-\Delta f) \times (t-T)) = \exp(j \times 2 \times \pi \times (f-\Delta f)$$
$$\times t - j \times 2 \times \pi \times f \times T + j \times 2 \times \pi \times \Delta f \times T) = \exp(j \times 2 \times \pi \times (f-\Delta f)$$
$$\times t + j \times \Delta\theta) \quad (2)$$

The complex conjugating unit 704 generates a complex conjugate signal P*(t-T) of the delay signal P(t-T) and outputs it to the multiplying unit 702.

The multiplying unit 702 performs complex multiplication of the input signal P(t) and the complex conjugate signal P*(t-T) and outputs the multiplication result to a frequency error calculating unit 705. The multiplication result is expressed by Expression (3).

$$P(t) \times P^*(t-T) \propto \exp(-j \times \Delta\theta) \quad (3)$$

The frequency error calculating unit 705 calculates this $\Delta\theta$ by performing an ARCTAN calculation on the inputted multiplication result and obtains a frequency difference $\Delta f$. The communication unit 306 corrects a frequency in the transmission/reception processing thereafter based on Δf obtained in the frequency difference detection unit 701. This frequency correction method can be realized by multiplying exp(j×2×π×Δf×t) with the I signal and the Q signal. Alternative, configuration may be taken such that an oscillation source is configured by a variable control oscillator, and Δf correction is performed to the frequency thereof. Note that the obtained frequency difference Δf has a noise component due to thermal noise and the like. For suppression of this noise component, averaging processing is effective. For example, a noise component can be suppressed by obtaining an average within a range of the repetition signal period T. Also, it is possible to further suppress a noise component by increasing a repetition number of repetition signals and obtaining an average of a plurality of repetition signals. As described later, in the present embodiment, in slave trigger for D-MIMO transmission, in which high-precision synchronization is required, synchronization precision is improved by increasing the number of LTFs.

Description will return to that of FIG. 6, and the AP 103 and the AP 104 perform D-MIMO transmission of a data frame to the STA 105 at a synchronized timing (steps S402, S502, and F602).

(Frame Structure)

Figure 8:
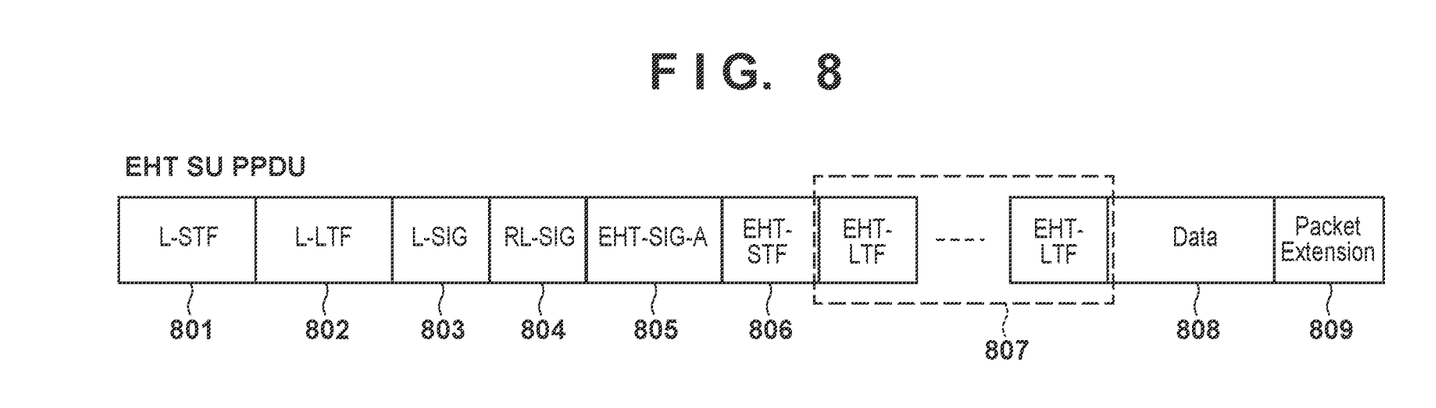
FIG. 8 is a view illustrating an example of a PHY frame structure of EHT SU PPDU.
Figure 9:
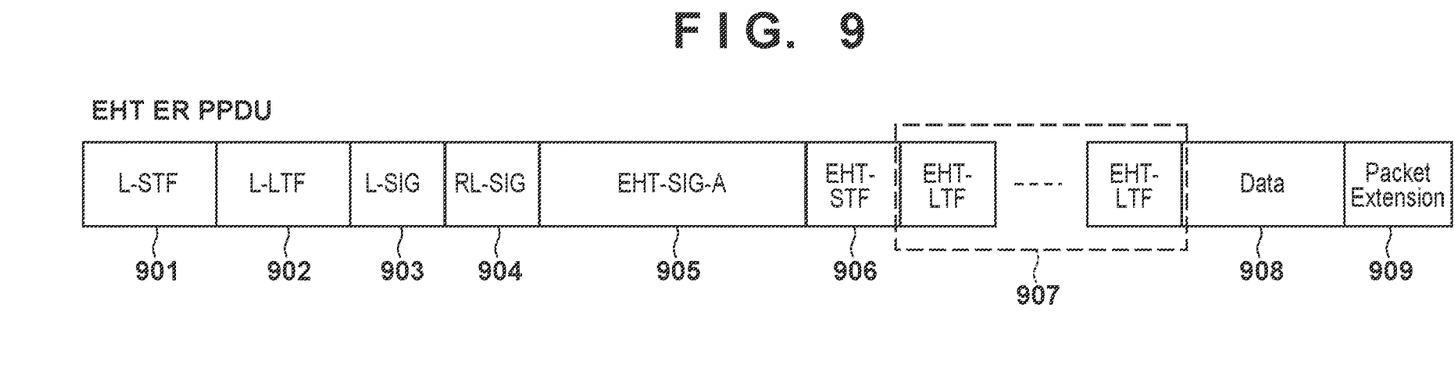
FIG. 9 is a view illustrating an example of a PHY frame structure of EHT ER PPDU.

An example of a structure of a PHY (physical) frame of a PPDU specified by the IEEE 802.11 EHT standard transmitted by the above-described sequence is illustrated in FIG. 8 and FIG. 9. Note that PPDU is an abbreviation of Physical Layer (PHY) Protocol Data Unit. Although it is assumed that slave triggers are transmitted by either of the PHY frames illustrated in FIG. 8 and FIG. 9, configuration may be taken so as to separately specify a PHY frame for slave triggers.

FIG. 8 illustrates an example of a structure of a PHY frame of an EHT SU PPDU, which is a PPDU for single-user (SU) communication (between an AP and a single AP/STA). FIG. 9 illustrates an example of a structure of a PHY frame of an EHT ER PPDU, which is a PPDU for communication in an extended range (communication range). EHT ER PPDUs are used for communication between an AP and a single AP/STA.

There are STF (Short Training Field), LTF (Long Term Field), and SIG (Signal Field) as information that PPDUs include in both FIG. 8 and FIG. 9. Using the example of FIG. 8, L (Legacy)-STF 801, L-LTF 802, and L-SIG 803, which are backward compatible with the IEEE 802.11a/b/g/n/ax standards are included in the head portion of the PPDU. Also, EHT-SIG-A 805, EHT-STF 806, and EHT-LTF 807 for the EHT standard are included commonly in each PPDU.

The L-STF 801 is used for PHY frame signal detection, automatic gain control (AGC), and timing detection, and the like. The L-LTF 802 arranged immediately after the L-STF 801 is used for high-precision frequency/time synchronization, CSI acquisition, and the like. The L-SIG 803 arranged immediately after the L-LTF 802 is used for transmission of control information, which includes information of data transmission rate and PHY frame length. A legacy device complying with the IEEE 802.11 a/b/g/n/ax standards can decode data of the above various legacy fields (L-STF 801, L-LTF 802, and L-SIG 803). The various legacy fields are similarly included in the PPDU illustrated in FIG. 9.

The frame of the EHT SU PPDU illustrated in FIG. 8 includes RL-SIG 804, the EHT-SIG-A 805, the EHT-STF 806, the EHT-LTF 807, a data field 808, a Packet extension 809 subsequently to the above L-STF 801, L-LTF 802, and L-SIG 803. Out of these, the RL-SIG 804 may be omitted. The EHT-SIG-A 805 is arranged after the L-SIG 803, the EHT-STF 806 is arranged immediately after the EHT-SIG-A 805, and the EHT-LTF 807 is arranged immediately after the EHT-STF 806. Note that the fields from the L-STF 801, the L-LTF 802, the L-SIG 803, the RL-SIG 804, the EHT-SIG-A 805, the EHT-STF 806, and up to the EHT-LTF 807 are called a "preamble".

Information such as EHT-SIG-A 1 and EHT-SIG-A 2 necessary for reception of PPDUs are included in the EHT-SIG-A 805. A group of subfields constituting the EHT-SIG-A 1 included in the EHT-SIG-A 805 and a group of subfields constituting the EHT-SIG-A 2 are illustrated in FIG. 10 and FIG. 11, respectively.

The EHT-STF 806 subsequent to the EHT-SIG-A 805 is an abbreviation of an EHT Short Training Field, and the main objective is to improve automatic gain control in MIMO transmission. The EHT-LTF 807 is an abbreviation of an EHT Long Training Field, and is used for the above-described frequency difference correction as well as propagation channel estimation. The data field 808 includes various kinds of data modulated in accordance with the modulation method indicated in the above-described EHT-SIG-A 1.

In the present embodiment, it is possible to set a repetition number for EHT-LTF in a GI+LTF Size subfield of the EHT-SIG-A 1 (FIG. 10) and set a repetition number that is larger than 4×EHT-LTF. Note that although it is assumed that it is possible to set 6×EHT-LTF or 8×EHT-LTF in FIG. 10, the present invention is not limited to this, and configuration may be taken so as to be able to set 5×EHT-LTF and 16×EHT-LTF. In the present embodiment, the repetition number for EHT-LTF is set to a number exceeding 4 in order to improve synchronization precision in transmission of slave triggers via noise suppression by averaging.

The EHT ER PPDU illustrated in FIG. 9, as described above, is a PPDU used for when it is desired to extend the communication range, and is used for communication between an AP and a single AP/STA. The EHT ER PPDU includes L-STF 901, L-LTF 902, L-SIG 903, RL-SIG 904, EHT-SIG-A 905, EHT-STF 906, EHT-LTF 907, a data field 908, and a Packet extension 909. Out of these, the RL-SIG 904 is not necessary. The L-LTF 902 is arranged immediately after the L-STF 901, the L-SIG 903 is arranged immediately after the L-LTF 902, the EHT-SIG-A 905 is arranged after the L-SIG 903, the EHT-STF 906 is arranged immediately after the EHT-SIG-A 905, and the EHT-LTF 907 is arranged immediately after the EHT-STF 906. Note that the fields from the L-STF 901, the L-LTF 902, the L-SIG 903, the RL-SIG 904, the EHT-SIG-A 905, the EHT-STF 906, and up to the EHT-LTF 907 are called a "preamble". Description will be omitted for information included in each field as they are of the same content as the EHT SU PPDU illustrated in FIG. 8. Note that in the EHT-SIG-A 905, it is possible, similarly to the EHT SU PPDU of FIG. 8, to set a repetition number that is larger than 4×EHT-LTF for GI+LTF Size in the EHT-SIG-A 1. Also, an EHT-LTF of the set number will be included in the EHT-LTF 907.

As described above, if the frame structures of the EHT SU PPDU and the EHT ER PPDU, which are PPDUs used in the IEEE 802.11 EHT standard, indicated in the present embodiment is used, it is possible to transmit EHT LTF at a repetition number exceeding 4. In other words, it is possible to increase synchronization precision by setting a large repetition number for EHT LTF at the time of transmission of a slave trigger, thereby improving communication performance in D-MIMO transmission.

Note that although FIG. 8 and FIG. 9 illustrate frame structures that are backward compatible with the IEEE 802.11 a/b/g/n/ax standards, in a case where there is no need to ensure backward compatibility, L-STF and L-LTF fields may be omitted. EHT-STF and EHT-LTF may be inserted in place of these.

Also, although in the present embodiment, it is assumed that a repetition number for EHT LTF of a slave trigger is increased, the present invention is not limited to this, and in a transmission mode in which high-precision synchronization is required, configuration may be taken so as to increase a repetition number in any frame. For example, since transmission errors due to frequency differences are more likely to occur in higher order modulation such as 1048 QAM, configuration may be taken so as to set a repetition number of EHT LTF of a higher order modulation data frame.

Figure 12:
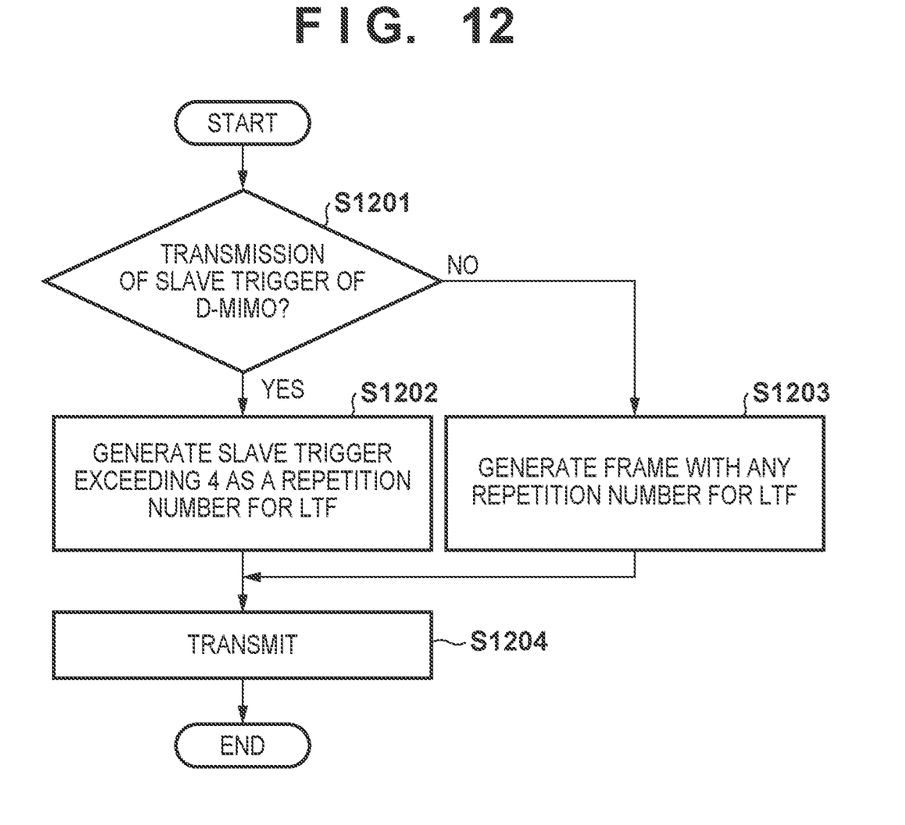
FIG. 12 is a flowchart illustrating an example of processing of the master-AP.

Also, configuration may also be taken such that when the AP 103, which is the master, transmits a slave trigger, it is determined whether or not that is a D-MIMO slave trigger and a repetition number for LTF is decided thereupon. FIG. 12 illustrates a processing procedure of the AP 103 (of the control unit 302), which is the master in this case. Description will be given below with reference to this figure.

In step S1201, the control unit 302 determines whether or not the D-MIMO slave trigger is to be transmitted. In a case where the determination in step S1201 is Yes, the control unit 302 advances the processing to step S1202, and generates a slave trigger in which the repetition number for LTF is a number exceeding 4 (may be 6 or 8). Also, in a case where the determination in step S1201 is No (the frame to be transmitted is other than a slave trigger), the control unit 302 advance the processing to step S1203, and generates a frame in which the repetition number for LTF is set to any number that can be set in the GI+LTF Size subfield. Then, in step S1204, the control unit 302 transmits the generated frame by controlling the communication unit 306. Note that in the processing of steps S1202 and S1203, the repetition number for LTF of a slave trigger may be set to a value that is larger than other frames. For example, while the repetition number for LTF of a slave trigger is set to 6, the repetition number for LTF of other frames that do not need synchronization precision is set to 2. Accordingly, the repetition number for LTF of each frame may be set flexibly in accordance with necessary synchronization precision.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the above embodiments and various changes and modifications can be made within the spirit and scope of the present invention. Therefore, to apprise the public of the scope of the present invention, the following claims are made.

The invention claimed is:

1. A master access point (AP) which constitutes a wireless network by cooperating with a slave AP, comprising:
  one or more processors; and
  one or more memories that store computer-readable instructions for causing, when executed by the one or more processors, the master AP to perform:
  a generation of a synchronization frame whose repetition number for a Long Training Field, in a case of transmitting the synchronization frame for performing communication by Distributed multiple input and multiple output (MIMO), is larger than a repetition number for a Long Training Field in a case of transmitting a frame other than the synchronization frame for performing communication by Distributed MIMO; and
  a transmission of the generated synchronization frame to said slave AP to cooperate with said slave AP.

2. A method for controlling a master access point (AP) which constitutes a wireless network by cooperating with a slave AP, the method comprising:
  generating a synchronization frame whose repetition number for a Long Training Field in a case of transmitting the synchronization frame for performing communication by Distributed multiple input and multiple output (MIMO), is larger than a repetition number for a Long Training Field in a case of transmitting a frame other than the synchronization frame for performing communication by Distributed MIMO; and
  transmitting the generated synchronization frame to said slave AP to cooperate with said slave AP.

3. A non-transitory computer-readable storage medium storing a computer program that is read and executed by a processor in a master access point (AP) that constitutes a wireless network by cooperating with a slave AP, wherein the program causes the master AP to execute:
  a generation of a synchronization frame whose repetition number for a Long Training Field, in a case of transmitting the synchronization frame for performing communication by Distributed multiple input and multiple output (MIMO), is larger than a repetition number for a Long Training Field in a case of transmitting a frame other than the synchronization frame for performing communication by Distributed MIMO; and
  a transmission of the generated synchronization frame to said slave AP to cooperate with said slave AP.

\* \* \* \* \*